June 26, 1928.

F. J. BRUEGGEMANN

FEEDING DEVICE 1,674,634

Filed April 25, 1924

INVENTOR
F. J. BRUEGGEMANN

BY

ATTORNEY

Patented June 26, 1928.

1,674,634

UNITED STATES PATENT OFFICE.

FRANK J. BRUEGGEMANN, OF EAST ST. LOUIS, ILLINOIS.

FEEDING DEVICE.

Application filed April 25, 1924. Serial No. 708,862.

My invention relates to a feeding device and is particularly adapted for feeding materials which do not flow freely such, for example, as ground hay, rolled oats, bran and the various by-products of mills. While especially designed for non-free flowing products, such as above enumerated, on account of the accuracy with which the amount of feed may be regulated, it is also desirable for feeding free flowing materials.

Figure 2:
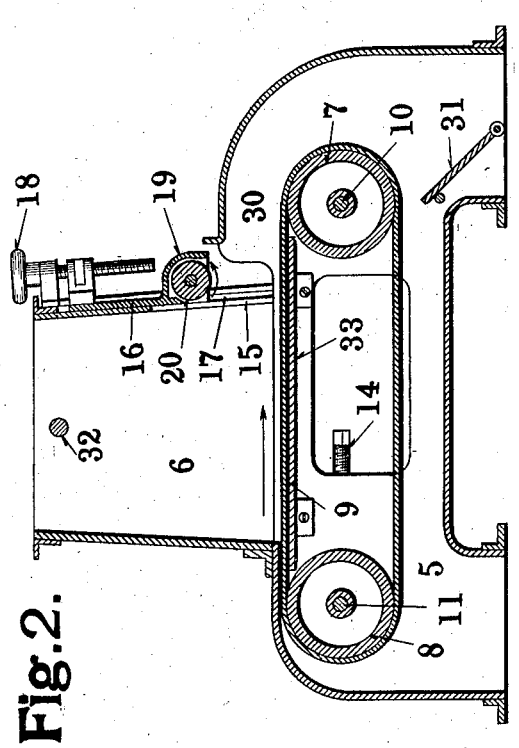
Figure 4:
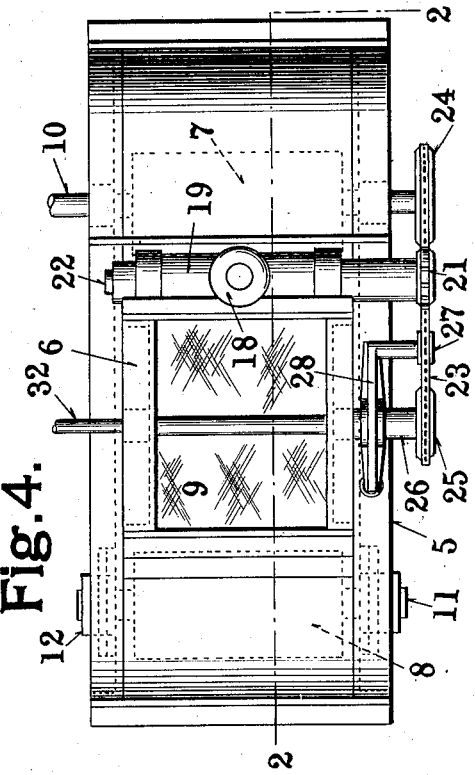
Figure 1:
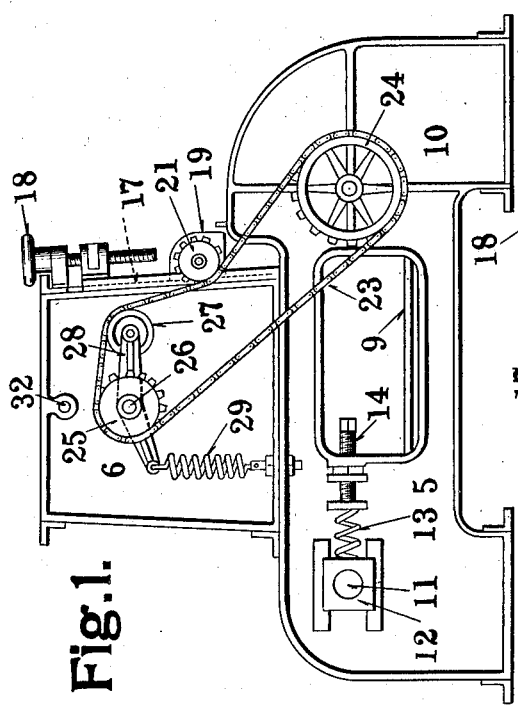
Figure 3:
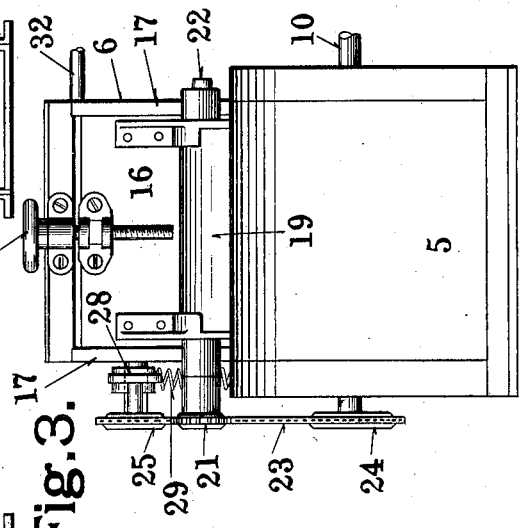

In the accompanying drawings, which illustrate one form of feeding device made in accordance with my invention, Figure 1 is a side elevation; Figure 2 is a section taken on the line 2—2 of Figure 4; Figure 3 is an end view; and Figure 4 is a top plan view.

The casing of the machine comprises a base 5, forming a feeding chamber, and a hopper 6 extending upwardly therefrom. Situated in the feeding chamber are a pair of drums 7 and 8 around which passes an endless feed apron 9, one side of which forms the bottom of the hopper 6. The drum 7 is mounted on the driving shaft 10 to which power is applied by any suitable means (not shown). The drum 8 is mounted on a shaft 11 journaled in sliding boxes 12, which are moved by springs 13 to tighten the feed apron 9. Screws 14 serve to regulate the tension of the springs 13.

An outlet opening 15 (Figure 2) is formed in the front wall of the hopper 6 and its size is adjusted by a panel 16 sliding in guide ways 17 and controlled by a hand wheel 18. Formed on the lower edge of the panel 16 is a hood 19 in which is contained a feed roll 20 cooperating with the apron 9. A sprocket wheel 21 on the shaft 22 of the roll 20 is driven from the shaft 10 by a sprocket chain 23 passing around a sprocket wheel 24 on the shaft 10 and an idler 25 mounted on a stud 26 on the side of the hopper 6. This idler may be either a sprocket or a plain pulley. In order to take up the slack of the chain 23 as the panel 16 is raised or lowered, I provide a tightener pulley 27 carried by a rocker-arm 28, preferably mounted on the stud 26. A coil spring 29 attached to the opposite end of the arm automatically moves the pulley to take up the slack of the chain. It is to be noted that the proportion of the diameter of the drum 7 to that of the roll 20 should be substantially the same as the proportion of the diameter of the sprocket wheel 24 to that of the sprocket wheel 21 so that the peripheral speed of the roll 20 will be the same, or nearly the same as the speed of travel of the apron 9.

The effective area of the outlet opening 15 is controlled by raising and lowering the panel 16 and the material passing out between the apron and roll enters the upper end of an outlet passage 30 formed by enlargement of the forward end of the base 5. The material then passes either down through the usual discharge chute, or may be deflected or, for example, in securing samples, by a pivoted plate 31. 32 is an agitator shaft driven by any suitable means (not shown). The agitator blades have been omitted as the particular form of blades used is of no importance to the present invention.

In order to prevent the apron 9 from sagging under the weight of the material upon it I provide a plate or table 33, which is secured to the side walls of the feeding chamber, which effectively supports the apron and the material thereon.

Owing to the fact that the roll 20 is positively driven at substantially the same surface speed as the feed apron 9, the machine will not only feed non-free flowing materials without choking, but will feed materials of any kind with greater uniformity than feeding devices of the class now in common use.

Having fully described my invention, what I claim as new and desire to secure by Letters Patent of the United States is:

1. In a device of the class described, the combination with a hopper, of a smooth imperforate travelling apron forming the bottom of said hopper and providing a feeding surface, a member providing a second smooth imperforate travelling surface cooperating with said apron to form a discharge opening leading directly from the hopper, means for adjusting the distance between said member and apron to regulate the discharge opening, and means for driving said member and apron in the same direction and at approximately the same surface speed.

2. In a device of the class described, the combination with a hopper, of a smooth imperforate travelling apron forming the bottom of said hopper and providing a feeding surface, a smooth imperforate roller cooperating with said apron to form a discharge opening leading directly from the hopper, means for adjusting the distance between said roller and apron to regulate the discharge opening, and means for driving said apron and roller in the same direction and at approximately the same surface speed.

3. In a device of the class described, the combination with a base forming a housing, of a hopper carried by said base, an endless travelling belt mounted in said base and forming the bottom of the hopper, one wall of said hopper being provided with a discharge opening, a vertically adjustable roller for regulating the size of said discharge opening, one end of the base being provided with an upward extension aligning with and forming a continuation of said discharge opening, and means for driving said belt and roller in the same direction and at approximately the same speed.

4. In a device of the class described, the combination with a hopper, of an endless travelling conveyor of imperforate material forming the bottom of said hopper, one wall of said hopper being provided with an outlet opening of which said conveyor forms the lower boundary, a roller forming the upper boundary of said outlet, and means for driving said roller in the same direction and approximately the same surface speed as said conveyor.

In testimony whereof, I have hereunto set my hand this the 22nd day of April, 1924.

FRANK J. BRUEGGEMANN.